United States Patent
Drahm et al.

(10) Patent No.: US 7,523,662 B2
(45) Date of Patent: Apr. 28, 2009

(54) PROCESS METER

(75) Inventors: Wolfgang Drahm, Freising (DE); Helmut Zeislmeier, Freising (DE); Alfred Rieder, Landshut (DE); Gabriele Fröhlich, Hallbergmoos (DE)

(73) Assignee: Endress + Hauser Flowtec AG, Reinach (CH)

( * ) Notice: Subject to any disclaimer, the term of this patent is extended or adjusted under 35 U.S.C. 154(b) by 759 days.

(21) Appl. No.: 10/693,606

(22) Filed: Oct. 27, 2003

(65) Prior Publication Data

US 2004/0261528 A1 Dec. 30, 2004

Related U.S. Application Data

(60) Provisional application No. 60/422,866, filed on Nov. 1, 2002.

(30) Foreign Application Priority Data

Oct. 25, 2002 (DE) ................................ 102 50 065

(51) Int. Cl.
*G01F 23/28* (2006.01)
*G01D 11/10* (2006.01)
(52) U.S. Cl. ....................... 73/430; 73/290 V
(58) Field of Classification Search ............... 73/290 V, 73/430, 649, 662; 367/908; 342/124; 116/227
See application file for complete search history.

(56) References Cited

U.S. PATENT DOCUMENTS

| | | | | |
|---|---|---|---|---|
| 4,130,018 A | * | 12/1978 | Adams et al. ............. | 73/290 V |
| 4,594,584 A | | 6/1986 | Pfeiffer et al. ............. | 340/620 |
| 4,811,593 A | * | 3/1989 | Miura et al. ............... | 73/54.26 |
| 4,827,771 A | * | 5/1989 | Cary et al. ................. | 73/644 |
| 4,850,213 A | * | 7/1989 | Steinebrunner et al. ... | 73/290 V |
| 4,909,068 A | * | 3/1990 | Miura et al. ................ | 73/32 A |
| 5,131,279 A | | 7/1992 | Lang et al. ............... | 73/861.27 |
| 5,596,139 A | * | 1/1997 | Miura et al. ............... | 73/54.24 |
| 5,664,456 A | * | 9/1997 | Eckert ...................... | 73/290 V |
| 5,866,815 A | * | 2/1999 | Schwald et al. ........... | 73/290 V |
| 6,085,582 A | * | 7/2000 | Tripathi et al. ............ | 73/118.1 |
| 2001/0039829 A1 | * | 11/2001 | Wenger et al. ............. | 73/54.41 |
| 2002/0026822 A1 | * | 3/2002 | Reading et al. ............ | 73/31.05 |

FOREIGN PATENT DOCUMENTS

| | | |
|---|---|---|
| DE | 12 48 958 C | 8/1967 |
| DE | 195 45 091 A1 | 6/1997 |

(Continued)

*Primary Examiner*—Hezron Williams
*Assistant Examiner*—Tamiko D Bellamy
(74) *Attorney, Agent, or Firm*—Bacon & Thomas, PLLC

(57) ABSTRACT

The process meter comprises a sensor that can be mounted in a wall of a vessel for holding or conveying a process medium, and a meter-electronics case mechanically coupled to the sensor. In operation, the electronics case is at least intermittently subjected to vibrations either generated in the sensor itself or transmitted via the sensor. To reduce amplitudes of such vibrations of the electronics case, at least one vibration absorber is affixed to a wall of the electronics case. This vibration absorber is vibrated at least intermittently in order to dissipate vibrational energy taken into the electronic case. By the suppression of such case vibrations, spurious components in the measurement signal can be reduced to the point that a significant improvement in signal-to-noise ratio is obtained.

38 Claims, 6 Drawing Sheets

FOREIGN PATENT DOCUMENTS

| | | |
|---|---|---|
| DE | 195 48 467 A1 | 6/1997 |
| EP | 991307 A2 * | 4/2000 |
| GB | 1 219 066 A | 1/1971 |
| JP | 60174991 A * | 9/1985 |
| JP | 2002022635 A * | 1/2002 |

* cited by examiner

PROCESS METER

CROSS-REFERENCE TO RELATED APPLICATION

This application claims the benefit of the filing of Provisional Application No. 60/422,866, filed Nov. 1, 2002.

TECHNICAL FIELD

This invention relates to a process meter with a sensor which can be mounted in a wall of a vessel for holding or conveying a process medium, and with a meter-electronics case mechanically coupled to the sensor.

BACKGROUND OF THE INVENTION

In industrial process measurement technology, process meters, so-called field meters, are used on site to generate measurement signals representative of analog or digital process variables, particularly in connection with the automation of chemical or other industrial processes. The process variables to be sensed may be, for instance, a mass flow rate, a filling or threshold level, a pressure, or a temperature. Such field meters are described, for example, in EP-A 984 248, U.S. Pat. Nos. 3,878,725, 4,308,754, 4,468,971, 4,574,328, 4,594,584, 4,617,607, 4,716,770, 4,850,213, 5,052,230, 5,131,279, 5,363,341, 5,796,011, 6,236,322, 6,397,683, or WO-A 00/36379.

To sense one or more process variables, the field meter has a suitable sensor, generally in the form of a physical-to-electrical transducer, which is mounted in a wall of a vessel holding or conveying a, e.g. liquid, powdery, vaporous, or gaseous, process medium, for instance in a pipe or a tank, and which serves to generate at least one measurement signal representative of the process variable being sensed, particularly an electric measurement signal.

The sensor is connected to suitable meter electronics, which serve in particular to process or evaluate the at least one measurement signal. Via a data transmission system coupled to the meter electronics, field meters of the kind described are linked together and to process control computers, where they send the measurement signal via (4- to 20-mA) current loops and/or via digital data buses, for example. For the data transmission systems, Fieldbus systems, particularly serial systems, such as PROFIBUS-PA, FOUNDATION FIELDBUS, and the corresponding communications protocols are used. By means of the process control computers, the transmitted measurement signals can be further processed and visualized as corresponding measurement results, e.g. on monitors, and/or converted to control signals for process control elements, such as solenoid valves, electric motors, etc.

To house the meter electronics, process meters of the kind described comprise an electronics case which, as proposed in U.S. Pat. No. 6,397,683 or WO-A 00/36379, for example, may be located at a distance from the field meter and be connected to the latter by a cord, or which, as also shown in EP-A 903 651 or EP-A 1 008 836, for example, is disposed directly at the field meter. Frequently, the electronics case, as shown in EP-A 984 248, U.S. Pat. Nos. 4,594,584, 4,716,770, or 6,352,000, for example, also serves to house some mechanical components of the sensor, such as diaphragm-, rod-, or sleeve-shaped bodies which deform or vibrate under mechanical action.

The advantage of a direct mechanical connection, particularly a rigid connection, between the electronics case and the sensor is that after installation of the sensor, virtually no further steps are necessary on site to fix the electronics case in position. However, any vibrations caused in the sensor or generated in the process and transmitted via the sensor, such as vibrations or pressure surges in a connected pipe, can be coupled into the electronics case nearly undamped. This coupling in vibrations, which is practically unavoidable particularly in the case of rigid connections, may, in turn, lead to vibrations with considerable amplitudes in the electronics case.

Acceleration forces or bending moments resulting from the case vibrations represent an increased mechanical load on the field meter as a whole and on the sensor supporting the electronics case in particular. During investigation of such case vibrations, acceleration forces of 10G (G=weight of the electronics case under test) were determined which caused deflections in excess of 50 μm.

It was also found, particularly in field meters with mechanical sensor components housed in the electronics case, that the case vibrations are superimposed as a spurious component on the useful component of the measurement signal or, in other words, are induced on the measurement signal as crosstalk.

If the case where vibrations have a resonant frequency which would lie approximately in the measuring range of the sensor or even in the range of a, e.g. operationally variable, frequency of the measurement signal, a separation of the useful component in the measurement signal from any spurious components may become virtually impossible. At any rate, since the meter electronics processing the measurement signal must be controllable over a comparatively wide signal level range and be highly selective while having a comparatively wide signal bandwidth, this separation of the useful component would require a considerable amount of additional circuitry, which would significantly increase the circuit complexity of the meter electronics and thus add to the manufacturing costs of the field meter.

SUMMARY OF THE INVENTION

It is therefore an object of the invention to avoid the above-described "crosstalk" induced by case vibrations on the measurement signal and thus reduce the spurious signal components in amplitude or energy.

To attain this object, the invention provides a process meter, particularly a field meter, comprising:
  a sensor which can be mounted in a wall of a vessel for holding or conveying a process medium, particularly in a wall of a pipe or tank; and
  an electronics case for meter electronics which is mechanically, particularly rigidly, coupled to the sensor,
  wherein the electronics case is at least intermittently subjected to vibrations generated in or transmitted via the sensor, and
  wherein, in order to reduce amplitudes of possible vibrations of the electronics case, at least one vibration absorber which is vibrated at least intermittently in order to dissipate vibrational energy taken into the electronics case is affixed to a wall of the electronics case.

In a first preferred embodiment of the invention, the vibration absorber is positioned at a distance, particularly as far as possible, from a joint between the sensor and the electronics case.

In a second preferred embodiment of the invention, the vibrated vibration absorber has a quality factor which is lower than a quality factor of the vibrating electronics case.

In a third preferred embodiment of the invention, the vibrated vibration absorber has a quality factor in the range of 1 to 5, particularly on the order of 3.

In a fourth preferred embodiment of the invention, the vibration absorber has a resonant frequency which differs from a resonant frequency of the electronics case by about 10% at the most.

In a fifth preferred embodiment of the invention, the vibration absorber has a resonant frequency which is less than a resonant frequency of the electronics case.

In a sixth preferred embodiment of the invention, the vibration absorber has mass which is greater than 1% of a mass of the electronics case.

In a seventh preferred embodiment of the invention, the vibration absorber is positioned within the electronics case.

In an eighth preferred embodiment of the invention, the vibration absorber comprises a disk- or cup-shaped plastic body having a, particularly disk- or plate-shaped, metal body fitted or embedded therein.

In a ninth preferred embodiment of the invention, the vibration absorber comprises a plastic body which is affixed to the wall of the electronics case, particularly with adhesive.

A basic idea of the invention is to minimize the amplitudes of vibrations of the electronics case by coupling the vibrational energy from the electronics case into the vibration absorber and dissipating this vibrational energy by means of the vibration absorber, thus "removing" it from the process meter.

By the suppression of the case variations, the spurious components may not be kept away from the measurement signal completely, but they can be reduced at least to the point that as a result of the improvement in signal-to-noise ratio, a separation of the useful component can now be effected via an estimation of the amplitudes of the various signal components. For the case where a resonant frequency of the case vibrations would lie approximately in the range of an operationally variable frequency of the measurement signal—this is frequently unavoidable in the case of sensors with at least one mechanical resonant frequency that varies in operation, for instance due to an amplitude response depending on or influenced by the process medium to be measured—this separation can thus still be effected on the basis of comparisons of the signal amplitudes with predetermined signal threshold values.

One advantage of the invention is that the measurement signal can be evaluated with a comparatively small amount of circuitry, particularly with conventionally used meter electronics.

Another advantage of the invention is that the use of such a vibration absorber affixed to a wall of the electronics case necessitates virtually no changes in the area of the process-signal terminals and interfaces, such as in the sensor components that may be housed in the electronics case. In addition, such a vibration absorber in the form of, e.g., a metal body embedded in a plastic body can be very simple and, thus, very rugged in construction.

The invention and further advantages will become more apparent from the following description of embodiments when taken in conjunction with the accompanying drawings. Throughout the various figures of the drawings, like parts have been designated by like reference characters, which have been omitted if this is conducive to clarity. dr In the drawings:

BRIEF DESCIPTION OF THE DRAWINGS

DESCRIPTION OF THE PREFERRED EMBODIMENTS

Figure 1:
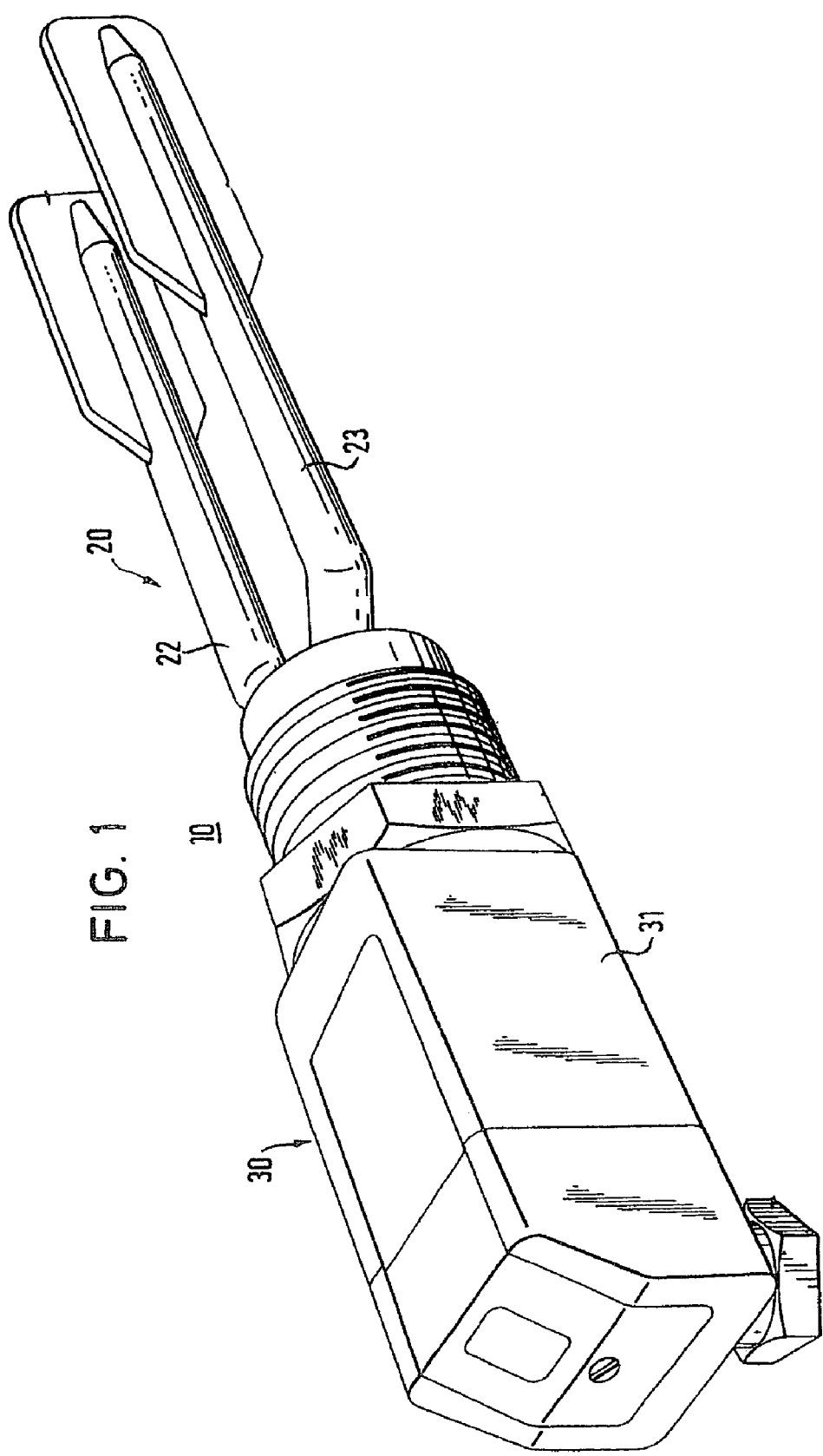
FIG. 1 is a perspective view of an embodiment of a process meter with an electronics case.
Figure 2:
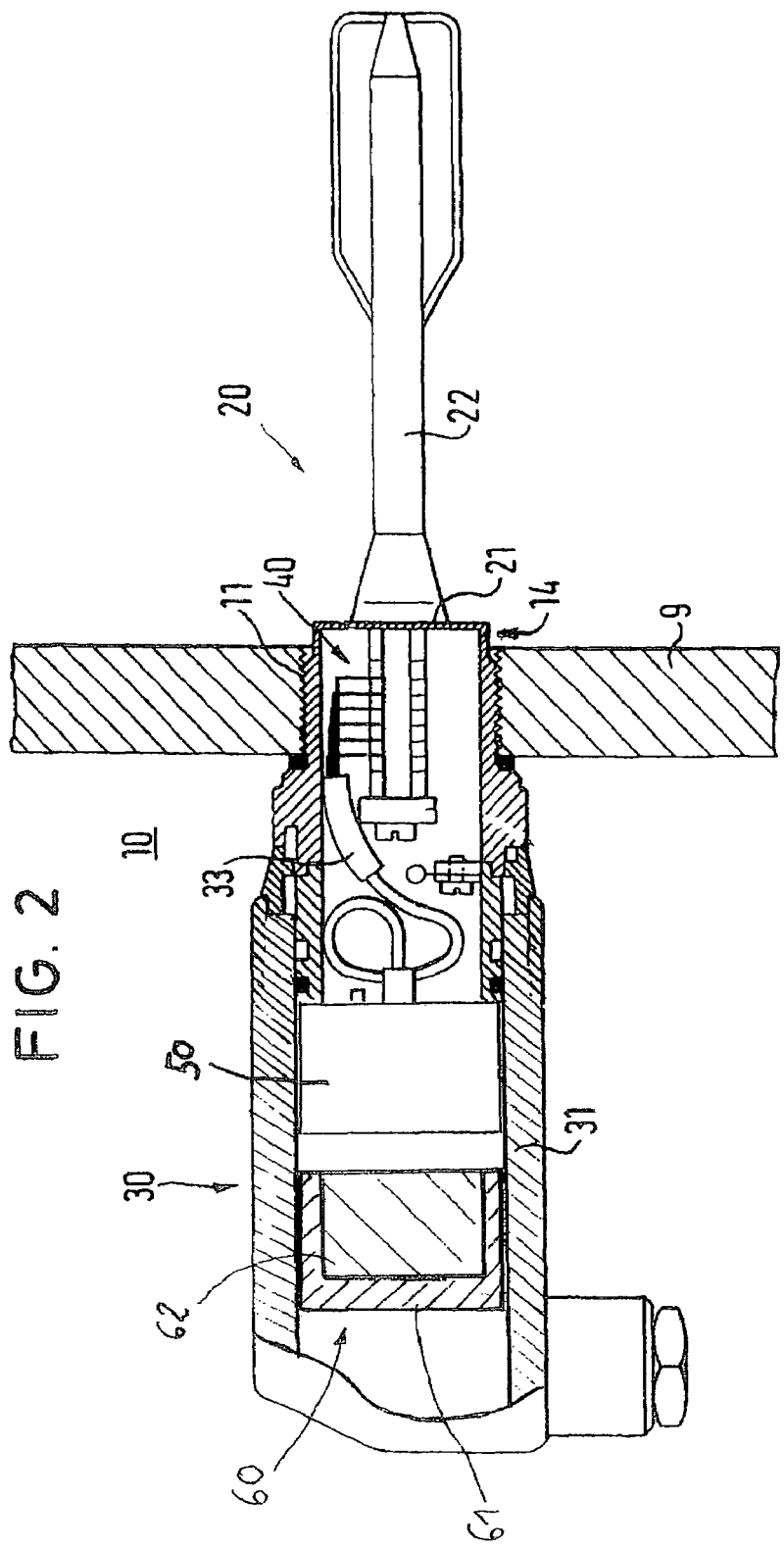
FIG. 2 is a side view, partially in cross section, of the process meter of FIG. 1.

In FIGS. 1 and 2, an embodiment of a process meter 10 is shown schematically in different views.

The process meter shown, 10, is a level limit monitor, which serves to determine and/or monitor the presence of the process medium in a vessel or whether the process medium has reached a predetermined level. To that end, process meter 10 is fixed by means of a threaded connection 11 in a wall 9 of a vessel (not shown) holding or conveying a process medium, for instance a liquid or a powder, e.g. in a tank or pipe. The construction and use of such level limit monitors, particularly their mechanical design and circuit design as well as methods of operating them, are described in detail in EP-A 984 248, U.S. Pat. Nos. 4,594,584, 5,844,491, 5,966,983, 6,138,507, and 6,236,322, for example.

To sense the level and generate a measurement signal representative thereof, process meter 10 comprises a sensor 20 in the form of a physical-to-electrical transducer, which touches the medium at the predetermined level, and a measuring and operating circuit 50 connected thereto by a line 33.

The sensor 20 in this embodiment is in the form of two vibrating rods 22, 23 affixed on the side of a diaphragm 21 facing the medium, which in use, driven by a piezoelectric transducer 40 affixed on the side of diaphragm 21 facing away from the medium, are excited into tuning-fork vibrations at a mechanical resonant frequency and which, for instance when the predetermined level is reached in the vessel, reaches into the process medium, whereby the resonant frequency of the excited vibrations is changed. The measurement signal may also be, for example, an alternating voltage driving, or generated by, the piezoelectric transducer 40.

To house the measuring and operating circuit 50 and any further electronic circuit components provided in process meter 10, such as a coupling circuit for a Fieldbus connected to the process meter, the latter comprises an electronics case 30 which is mechanically, particularly rigidly, connected with sensor 20 at a joint 14.

The joint may be implemented, for instance, by welding electronics case 30 to sensor 20 or by screwing the electronics case directly onto a necklike portion of the sensor, see also the above-mentioned EP-A 984 248.

If the sensor is accommodated in a specific supporting structure, such as a sensor case or a sensor tube suitable for insertion into a pipe, as is usually the case with vortex flowmeters, electromagnetic flowmeters, or Coriolis mass flowmeters, for example, the joint may also be implemented, for instance, by flange-mounting the electronics case to this supporting structure.

In operation, electronics case 30 is at least intermittently subjected to vibrations at a spurious frequency $f_s$ which are produced in sensor 20 itself or transmitted from medium-conveying pipes or medium-storing tanks to sensor 20.

Because of the essentially rigid coupling of electronics case 30 to sensor 20, these vibrations can be transmitted nearly undamped from sensor 20 to electronics case 30 and converted there to case vibrations. These case vibrations represent a considerable alternating load on sensor 20 and electronics case 30, particularly in the area of joint 14 or threaded connection 11. On the other hand, these case vibrations, besides causing the undesired additional mechanical loads, may result in a significant deterioration of the signal-to-noise ratio in the measurement signal, particularly if a resonant frequency $f_G$ of the electronics case lies both in the range of the spurious frequency $f_s$ and in a frequency transmission range of sensor 20, particularly of transducer 40.

Because of the generally very high quality factor of such electronics cases—it usually ranges between 10 and 100— the case vibrations thus excited may reach considerable amplitudes $X_G$, particularly high maximum amplitudes $X_{Gmax}$. As is well known, the quality factor is proportional to the reciprocal of the energy loss occurring per vibration period in the vibrating system, here the electronics case 30, referred to a total or initial energy taken into the vibrating system.

To reduce amplitudes $X'_G$ of such case vibrations, according to the invention, at least one vibration absorber 60 is affixed to a wall 31 of electronics case 30. This vibration absorber serves to dissipate any vibrational energy taken into electronics case 30, e.g., to convert it to heat energy, and thus to take it away from electronics case 30. To that end, vibration absorber 60 is so designed and so positioned in electronics case 30 that it is caused by the case vibration to vibrate at least intermittently, particularly out of phase with the case vibrations.

In one preferred embodiment of the invention, vibration absorber 60, as shown schematically in FIG. 2, is located within electronics case 30. To achieve maximum damping of the case vibrations, i.e., minimum vibration amplitudes $X'_G$ and particularly a low maximum vibration amplitude $X'_{Gmax}$, vibration absorber 60 is preferably positioned as far as possible from the joint 14 formed between sensor 20 and electronics case 30, for instance in the area of a case cover distal from this joint.

Vibration absorber 60 may take the form of, e.g., a disk- or cup-shaped plastic body 61 having a, particularly disk- or plate-shaped, metal body 62 fitted or embedded therein or otherwise fixed thereto. The use of such a plastic body 61, e.g. a body of rubber or a comparable material, with a metal body 62 fixed thereto, e.g. a steel plate, in addition to simplifying the construction of and ruggedizing the vibration absorber 60, has the advantage that the vibration absorber can be affixed to electronics case 30 in a simple manner, for instance by joining it directly to wall 31 of electronics case 30 or by attaching it to a staybolt welded directly to wall 31 of electronics case 30. It is also possible to fix plastic body 61 within electronics case 30 by clamping it in place, for example.

Figure 3:
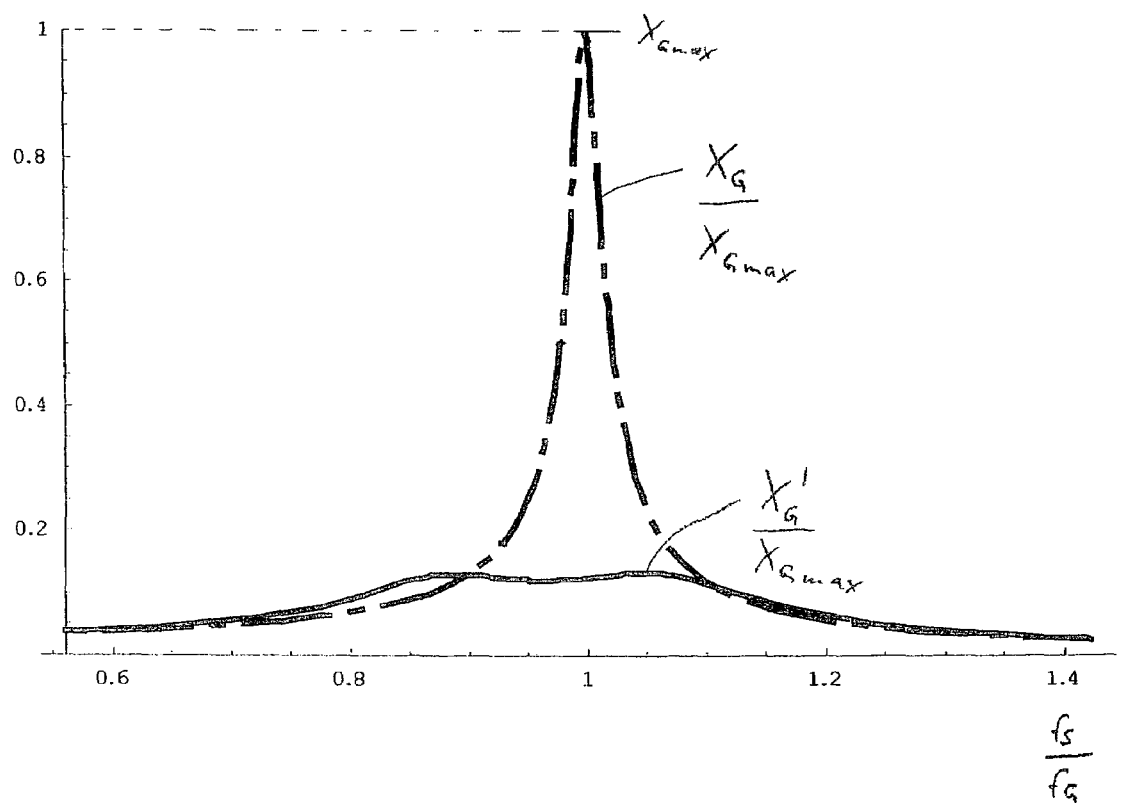
FIGS. 3 to 6 are graphs of measured amplitudes of vibrations of an electronics case as shown in FIGS. 1 or 2.
Figure 4:
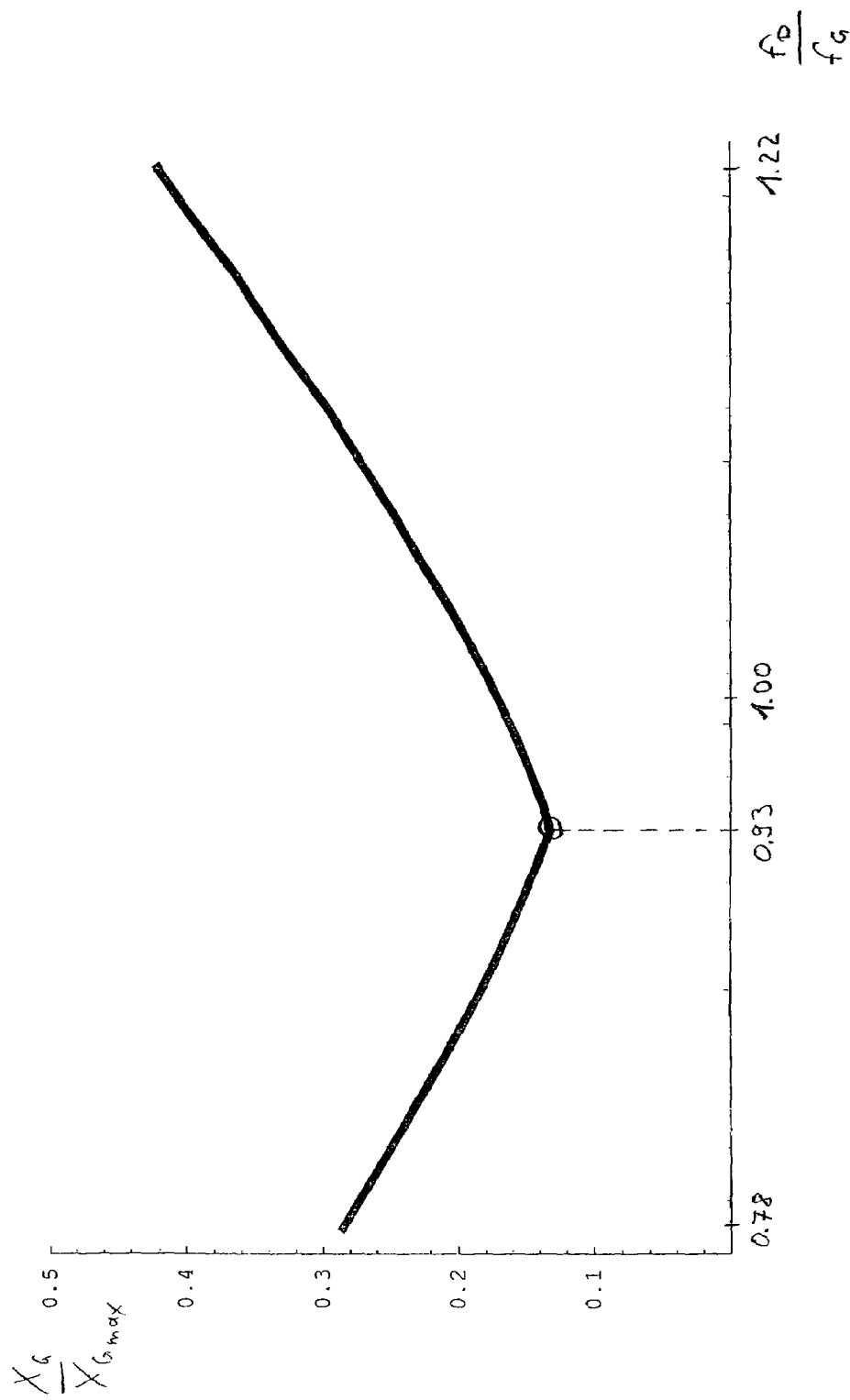
Figure 5:
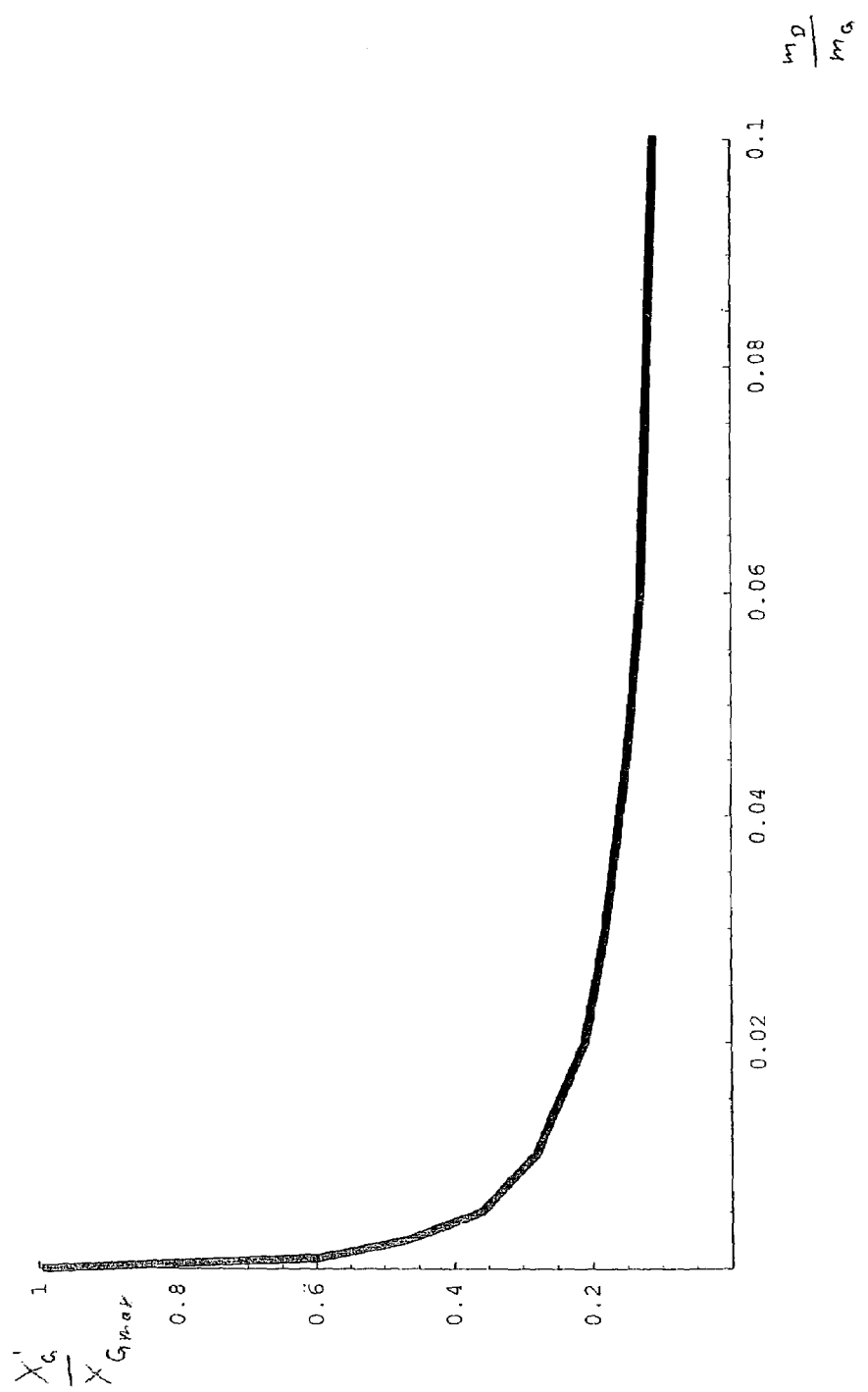

Investigations have also shown that particularly effective vibration damping, especially a very low maximum vibration amplitude, can be achieved if vibration absorber 60 has a resonant frequency $f_D$ which differs from a resonant frequency $f_G$ of electronics case 30 by about 10% at the most, particularly if this resonant frequency $f_D$ of vibration absorber 60 is less than the resonant frequency $f_G$ to be damped, see also FIGS. 3 and 4; the dot-and-dash curve in FIG. 3 shows a measured amplitude response $X_G(f_s/f_G)$, normalized to a maximum vibration amplitude $X_{Gmax}$, of an undamped electronics case, i.e., a case without a vibration absorber, while the solid curve shows a measured amplitude response $X'_G(f_s/f_G)$, normalized to the same maximum vibration amplitude $X_{Gmax}$, of the same electronics case provided with a vibration absorber.

Furthermore, it has been found that the mass $m_D$ which is effective for the resonant frequency $f_D$ of the vibration absorber should not be less than 1% of a mass $m_G$ of the electronics case. Particularly good results can be achieved with vibration absorbers whose effective mass $m_D$ is chosen to be above 5% of the mass $m_G$ of the electronics case.

Figure 6:
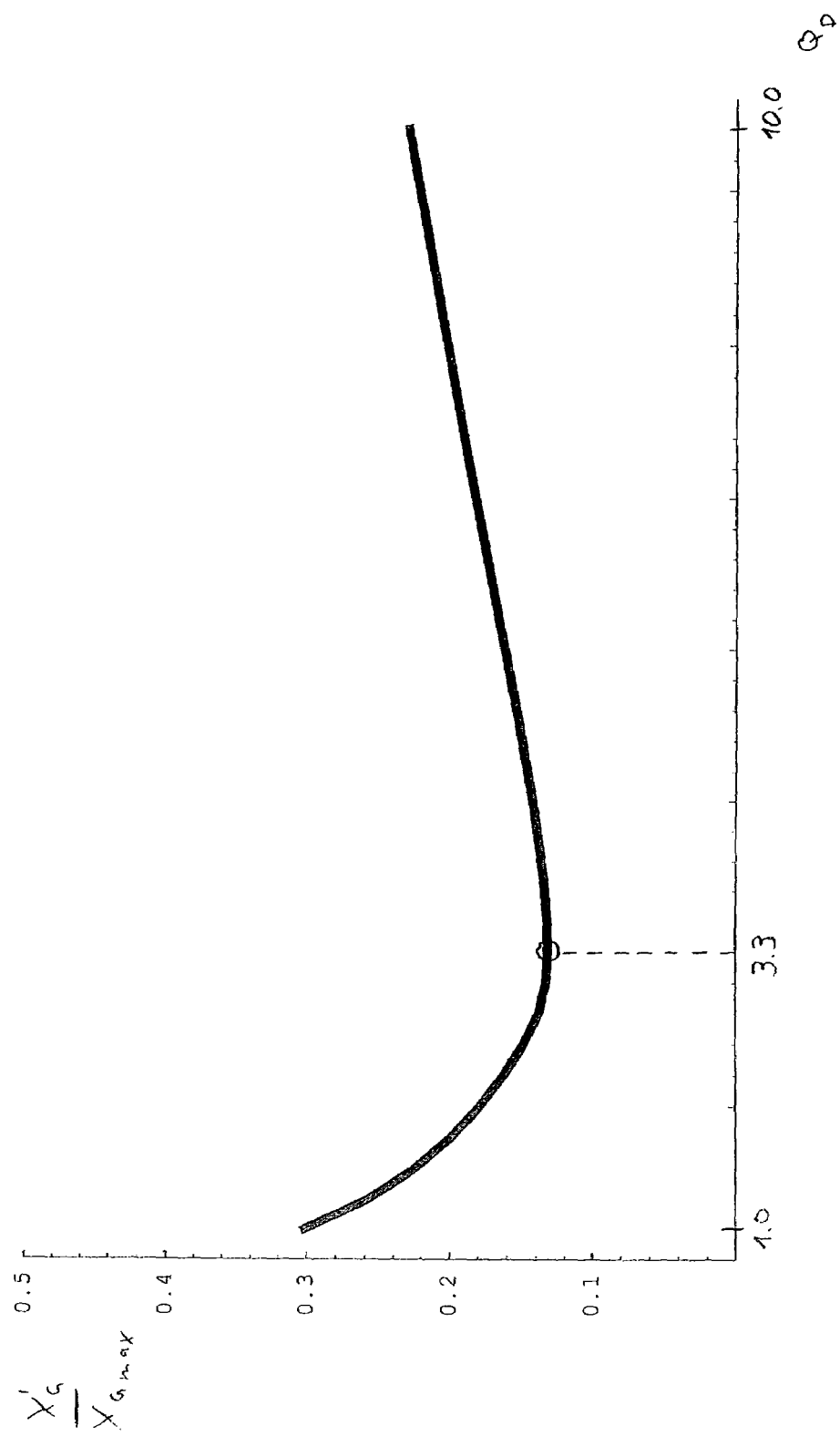

In another preferred embodiment of the invention, the vibration absorber has a quality factor $Q_D$ which is lower than a quality factor $Q_G$ of the vibrating electronics case. To the inventors' surprise it was found that extremely efficient damping of the case vibrations can be achieved particularly if the vibrated vibration absorber has a quality factor $Q_D$ in a range of 1 to 5, preferably between about 3 and 3.5, cf. FIG. 6.

Through the use of a vibration absorber of the kind described, possible case vibrations, and thus corresponding spurious components in the measurement signal, can be reduced, particularly over a great bandwidth, to the point that compared to meters with an undamped electronics case, the signal-to-noise ratio is significantly improved.

A further advantage of the electronics case according to the invention lies in the fact that it can be used not only for the level limit monitor shown herein by way of example, but for practically any type of process meter, i.e., regardless of the process variable to be measured and of the respective principle of measurement implemented, particularly for pressure gages, electromagnetic flowmeters, vortex flowmeters, Coriolis mass flowmeters, densimeters, viscometers, ultrasonic flowmeters, or ultrasonic level meters, etc.

The invention claimed is:

1. A process meter, comprising:
a sensor which can be mounted in a wall of a vessel for holding or conveying a process medium;
an electronics case for meter electronics which is mechanically coupled to said sensor; and
at least one vibration absorber, wherein:
said electronics case is at least intermittently subjected to vibrations generated in or transmitted via said sensor, and in order to reduce amplitudes of possible vibrations of said electronics case, said at least one vibration absorber which is vibrated at least intermittently in order to dissipate vibrational energy taken into said electronics case is affixed to a wall of said electronics case; and
said at least said vibration absorber is positioned at a distance from a joint between said sensor and said electronic case.

2. The process meter as set forth in claim 1, wherein:
said at least one vibration absorber is positioned as far as possible, from a joint between said sensor and said electronics case.

3. The process meter as set forth in claim 1, wherein:
said at least one vibrated vibration absorber has a quality factor, $Q_D$, which is lower than a quality factor, $Q_G$, of said vibrating electronics case.

4. A process meter, comprising:
a sensor which can be mounted in a wall of a vessel for holding or conveying a process medium;
an electronics case for meter electronics which is mechanically coupled to said sensor; and
at least one vibration absorber, wherein:
said electronics case is at least intermittently subjected to vibrations generated in or transmitted via said sensor, and in order to reduce amplitudes of possible vibrations of said electronics case, said at least one vibration absorber which is vibrated at least intermittently in order to dissipate vibrational energy taken into said electronics case is affixed to a wall of said electronics case; and said at least one vibrated vibration absorber has a quality factor, $Q_D$, in the range of 1 to 5.

5. A process meter, comprising:
a sensor which can be mounted in a wall of a vessel for holding or conveying a process medium;
an electronics case for meter electronics which is mechanically coupled to said sensor; and
at least one vibration absorber, wherein:
said electronics case is at least intermittently subjected to vibrations generated in or transmitted via said sensor, and in order to reduce amplitudes of possible vibrations of said electronics case, said at least one vibration absorber which is vibrated at least intermittently in order to dissipate vibrational energy taken into said electronics case is affixed to a wall of said electronics case; and
said at least one vibration absorber has a resonant frequency, $f_D$, which differs from a resonant frequency, $f_G$, of said electronics case by about 10% at the most.

6. The process meter as set for in claim 1, wherein:
said at least one vibration absorber has a resonant frequency, $f_D$, which is less than a resonant frequency, $f_G$, of said electronics case.

7. A process meter, comprising:
a sensor which can be mounted in a wall of a vessel for holding or conveying a process medium;
an electronics case for meter electronics which is mechanically coupled to said sensor; and
at least one vibration absorber, wherein:
said electronics case is at least intermittently subjected to vibrations generated in or transmitted via said sensor, and in order to reduce amplitudes of possible vibrations of said electronics case, said at least one vibration absorber which is vibrated at least intermittently in order to dissipate vibrational energy taken into said electronics case is affixed to a wall of said electronics case and, wherein:
said at least one vibration absorber has a mass, $m_D$, which is greater than 1% of a mass, $m_G$, of said electronics case.

8. The process meter as set forth in claim 1, wherein:
said at least one vibration absorber is disposed within said electronics case.

9. A process meter, comprising:
a sensor which can be mounted in a wall of a vessel for holding or conveying a process medium;
an electronics case for meter electronics which is mechanically coupled to said sensor; and
at least one vibration absorber, wherein:
said electronics case is at least intermittently subjected to vibrations generated in or transmitted via said sensor, and in order to reduce amplitudes of possible vibrations of said electronics case, said at least one vibration absorber which is vibrated at least intermittently in order to dissipate vibrational energy taken into said electronics case is affixed to a wall of said electronics case and,
said at least one vibration absorber comprises a disk- or cup-shaped plastic body having a metal body fitted or embedded therein.

10. The process meter as set forth in claim 1, wherein:
said at least one vibration absorber comprises a plastic body which is affixed to the wall of said electronics case.

11. The process meter as set forth in claim 1, wherein:
the process meter is selected from a group consisting of: level limit monitors; pressure gauges; electromagnetic flowmeters; vortex flowmeters; Coriolis mass flowmeters; densimeters, viscometers, ultrasonic flowmeters, and ultrasonic level meters.

12. The process meter as set forth in claim 1, wherein:
said electronics case is screwed onto a necklike portion of the sensor.

13. The process meter as set forth in claim 1, wherein:
said sensor is mounted in a wall of a pipe.

14. The process meter as set forth in claim 1, wherein:
said sensor is mounted in a wall of a tank.

15. A process meter, comprising:
a sensor for sensing at least one process variable, said sensor being mounted in a wall of a vessel,
an electronics case for meter electronics, said electronics case being mechanically coupled to said sensor, and said electronics case being at least intermittently subjected to vibrations; and
at least one vibration absorber for reducing amplitudes of vibrations of the electronics case, said at least one vibration absorber being located within said electronics case.

16. The process meter as claimed in claim 15, wherein:
said at least one vibrated vibration absorber has a quality factor, QD, which is lower than a quality factor, QG, of said vibrating electronics case.

17. The process meter as claimed in claim 15, wherein:
said at least one vibrated vibration absorber has a quality factor, QD, in the range of 1 to 5.

18. The process meter as set forth in claim 15, wherein:
said at least one vibrated vibration absorber has quality factor, QD, on the order of 3.

19. The process meter as claimed in claim 15, wherein:
said at least one vibration absorber has a resonant frequency, fD, which differs from a resonant frequency, fG, of said electronics case by about 10% at the most.

20. The process meter as claimed in claim 15, wherein:
said at least one vibration absorber has a resonant frequency, fD, which is less than a resonant frequency, fG, of said electronics case.

21. The process meter as claimed in claim 15, wherein:
said at least one vibration absorber has a mass, mD, which is greater than 1% of a mass, mG, of said electronics case.

22. The process meter as claimed in claim 15, wherein:
said at least one vibration absorber comprises a disk- or cup-shaped plastic body having a metal body fitted or embedded therein.

23. The process meter as set forth in claim 15, wherein:
said metal body is disk- or plate-shaped.

24. The process meter as claimed in claim 15, wherein:
said at least one vibration absorber is affixed to a wall of said electronics case.

25. The process meter as claimed in claim 15, wherein:
said at least one vibration absorber is positioned at a distance from a joint between said sensor and said electronics case.

26. The process meter as set forth in claim 15, wherein:
said at least one vibration absorber is positioned as far as possible from the joint between said sensor and said electronics case.

27. The process meter as set forth in claim 15, wherein:
said at least one vibration absorber comprises a plastic body which is affixed to the wall of said electronics case.

28. The process meter as set forth in claim 15, wherein:
said at least one vibration absorber is affixed to the wall of said electronics case with adhesive.

29. The process meter as claimed in claim 15, wherein:
said electronics case is screwed onto a necklike portion of the sensor.

30. The process meter as claimed in claim 15, wherein;
said electronics case is rigidly coupled to said sensor.

31. The process meter as claimed in claim 15, wherein;
the vibrations, to which the electronics case is subjected at least intermittently, are generated in the sensor.

32. The process meter as claimed in claim 15, wherein:
the vibrations, to which the electronics case is subjected at least intermittently, are transmitted via the sensor.

33. The process meter as claimed in claim 15, wherein:
the vessel, in which the sensor is mounted, is a pipe.

34. The process meter as claimed in claim 15, wherein:
the vessel, in which the sensor is mounted, is a tank.

35. The process meter as claimed in claim 15, wherein:
said process meter is selected from a group consisting of level limit monitors, pressure gages, electromagnetic flowmeters, vortex flowmeters, Coriolis mass flowmeters, densimeters, viscometers, ultrasonic flowmeters, and ultrasonic level meters.

36. The process meter as set forth in claim 4, wherein said at least one vibrated vibration absorber has a quality factor, $Q_D$, on the order of 3.

37. The process meter as set forth in claim 9, wherein said metal body is disk- or plate-shaped.

38. The process meter as set forth in claim 10, wherein plastic body which is affixed to the wall of said electronics case with adhesive.

* * * * *